Sept. 13, 1966  K. STOLL  3,272,083
SPEED REGULATING VALVE
Filed Nov. 3, 1965  2 Sheets-Sheet 1
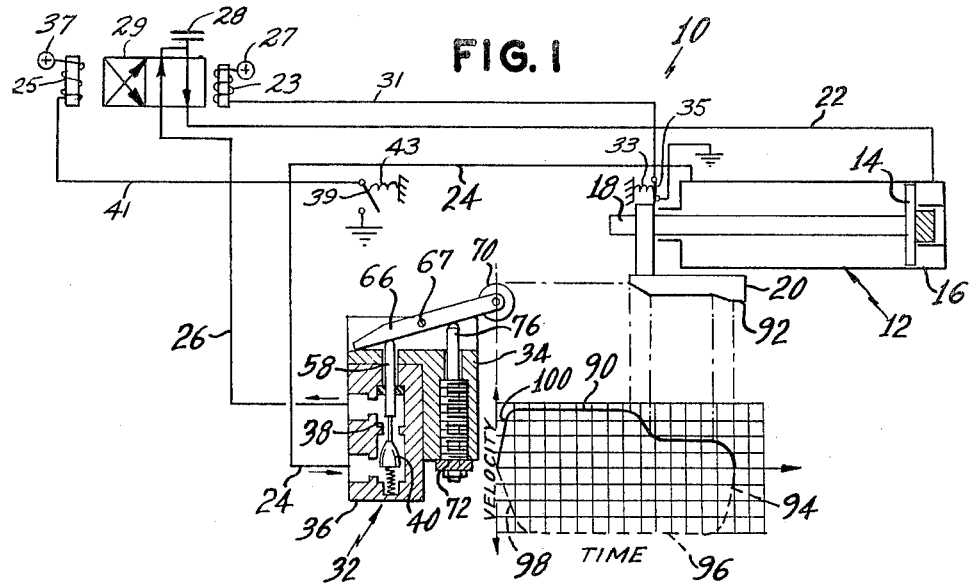
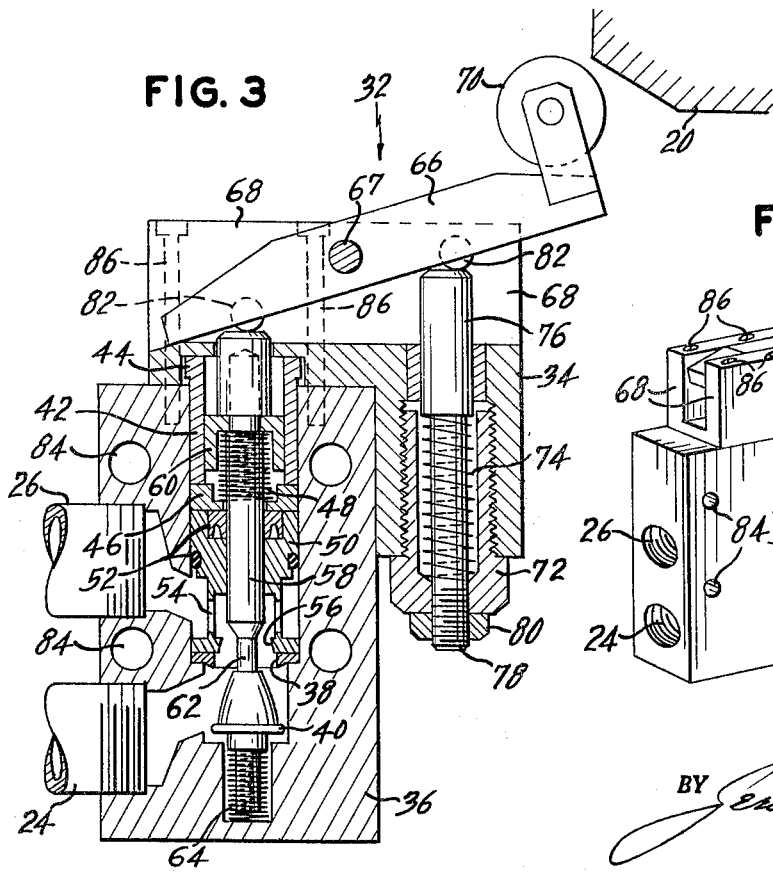
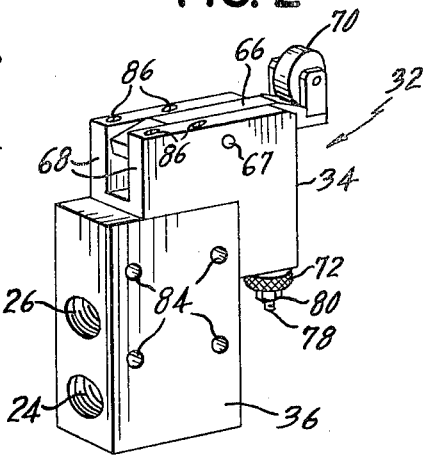
INVENTOR.
KURT STOLL
BY Jerome Bauer
ATTORNEY Sept. 13, 1966  K. STOLL  3,272,083
SPEED REGULATING VALVE
Filed Nov. 3, 1965  2 Sheets-Sheet 2
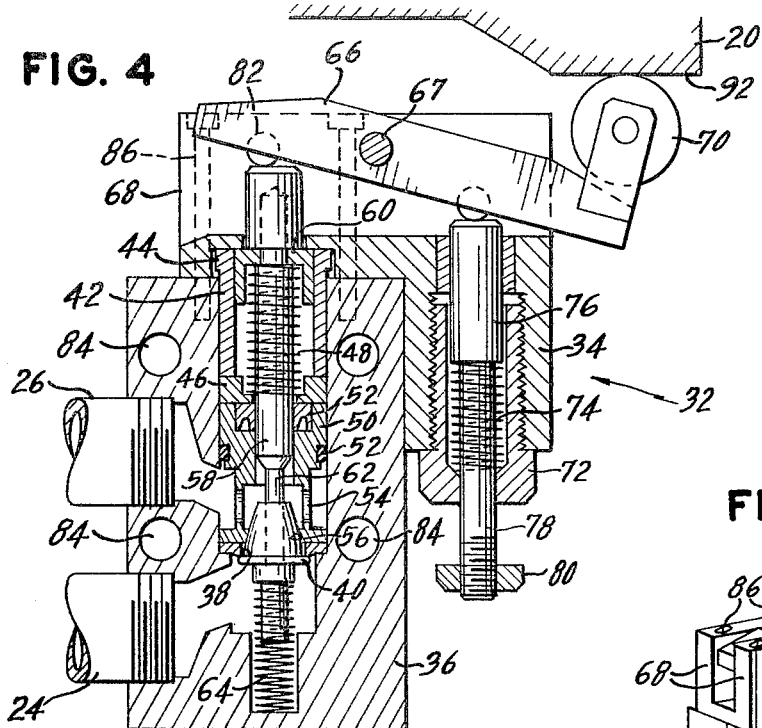
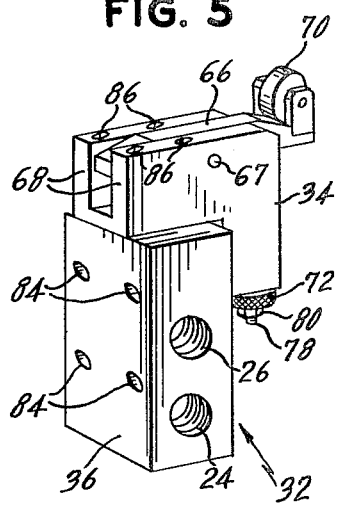
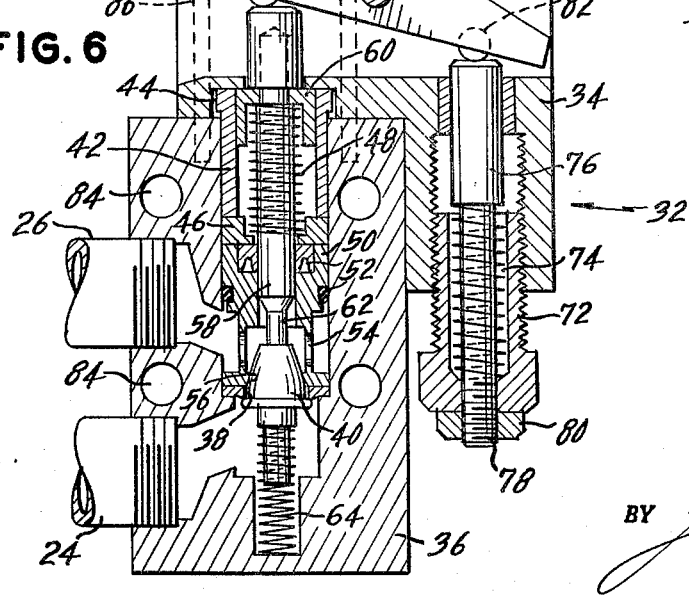
INVENTOR.
KURT STOLL
BY Jerome Bauer
ATTORNEY United States Patent Office 3,272,083
Patented Sept. 13, 1966

3,272,083
SPEED REGULATING VALVE
Kurt Stoll, 125 Hirschlandstrasse,
Esslingen (Neckar), Germany
Filed Nov. 3, 1965, Ser. No. 513,627
Claims priority, application Germany, Mar. 18, 1961,
F 33,444
6 Claims. (Cl. 91—405)

This invention is a continuation-in-part of copending United States patent application Serial No. 302,193, filed August 14, 1963, which, in turn, was a continuation-in-part of United States patent application Serial No. 176,145, filed February 27, 1962, both now abandoned, and relates to a speed regulating valve mechanism. More particularly, it relates to a system including a mechanism for automatically regulating the speed of operation of a piston for the intricate control of machine tools and the like.

In the operation of machine tools, for example, drilling machines and the like, it is often necessary that the tool execute or perform a number of working steps, each of which might necessarily need to be accomplished at different speeds. Thus, at the start or the beginning of work on a workpiece, it is often necessary to utilize a fast speed to bring the working tool to the workpiece. This is then followed by a slower speed to enable the work to be performed by the tool. Thereafter, it may be desirable to utilize a slow reverse speed during the withdrawal of the tool from the workpiece, to be followed by a fast reverse speed to completely space the tool from the workpiece so that the workpiece can be removed from the machine and a new one inserted in its place.

In accomplishing the aforementioned exemplary steps, it is desirable that the transition from one speed to the other be accomplished gradually without any abrupt or sudden movement that would tend to damage the workpiece or the tool. Hence, the purpose of the invention is to provide a speed regulating valve mechanism that will perform the aforementioned desirable functions.

Manual or hand operated valve mechanisms have been utilized in a vain attempt to accomplish the previously described purposes. However, in practice, such mechanisms have been cumbersome, they have required the constant attention of an operator upon whom rested the burden of performing the necessary functions in their required sequence at the proper finite intervals of time. If, perchance, the operator momentarily diverted his attention from his task, or if he did not hand turn or operate the valve cock of the valve mechanism at the correct time, the workpiece would not conform to the necessary specifications, and, therefore, would be considered ruined or unsatisfactory. Moreover, hand adjustment of valve control mechanisms is comparatively complicated and it is almost impossible to accurately control the working tool to perform short strokes in rapid succession within short periods of time.

Thus, hand controlled valve mechanisms that require the constant attention of an operator who must devote his entire time to watching the machine tool and controlling its parts, is undesirable. Accordingly, an object of the invention is to provide a system including a speed regulating valve mechanism that operates automatically without the need for human attention to control the speed of operation of an associated machine tool causing it to perform work and movements at many different desired speeds in preselected sequential intervals of time, smoothly, uninterruptedly and without abrupt change.

Another object of the invention is to obviate the need for or the attention of a trained or skilled operator and thereby eliminate the consequent possible introduction of human error and cost in the performance of the work.

Still another object of the invention is to provide a speed regulating valve mechanism that is extremly simple in construction, easy to manufacture and, therefore, inexpensive.

Other and further objects of this invention reside in the structures and arrangements hereinafter more fully described with reference to the accompanying drawings in which:

FIG. 1 is a schematic view of a system including a speed regulating valve mechanism constructed according to the teaching of the invention and illustrating one of its details of operation, FIG. 2 is a reduced scale perspective view of the speed regulating valve mechanism shown in schematic in FIG. 1, FIG. 3 is an enlarged vertical cross-section of the details of the speed regulating valve mechanism shown in FIG. 2 and illustrating the valve thereof in its open condition, FIG. 4 is a vertical cross-section similar to FIG. 3 illustrating the valve in its closed condition, FIG. 5 is a perspective view of the speed regulating valve mechanism showing the valve block rotated 90° from that shown in FIG. 2, and FIG. 6 is a vertical cross-section of the speed regulating valve mechanism illustrating another position of the operating lever.

Referring now to the drawings and more particularly to FIG. 1, the numeral 10 generally identifies an automatically controlled fluid system which includes a piston structure generally identified by the numeral 12. The piston structure 12 has a piston element 14 movable in a housing 16. The piston element is connected to a stem 18 which, in turn, is connected with a contoured guide gear or curved rail more commonly referred to as a cam 20, by a transversely extending foot member 17.

The piston element 14 is adapted to be moved reciprocably and at a predetermined desired speed within the housing 16 and after it reaches its extent of travel in one direction, its movement automatically reverses in the other direction. Hence, the operation of the piston is well adapted for controlling the movement of a working tool, for example, a drilling machine that may be connected with the stem 18 for operation thereby. The working tool is not shown in the drawing inasmuch as the details thereof form no part of the present invention. The piston structure is connected with and forms a part of a fluid circuit which includes the fluid conveying lines 22, 24 and 26. The fluid circuit is provided with fluid from a source 28 through a conventional 4-way valve 29. The source 28 may be a conventional compressor if the moving fluid is a gas; as air, or it may be a pump if the fluid is a liquid. The valve 29 is operated to a first position to provide a path for the fluid from the source 28 to the line 22 and from the line 26 back to the source 28 or to the atmosphere if the fluid is compressed air. On the other hand, the valve 29 is also operable to a second position to provide a path for the fluid from the source 28 to the line 26 and from the line 22 back to the source 28 or to the atmosphere if the fluid is air or another gas.

Operation of the valve 29 between the first and second states is accomplished automatically by the piston stem 18 and the member 17 carried thereon when the piston element reaches the terminal points of its travel. The valve 29 may be a conventional spool-type valve which may be shifted longitudinally to place the valve 29 in either the first or the second position. The symbolic representation in FIG. 1 of the conventional four-way valve 29 is that accepted for standardized international use by the Joint International Conference now known as the National Fluid Power Association.

Respective solenoid windings 23 and 25 are adapted to shift the spool member of the valve 29 in opposite directions to respectively place the valve 29 in the first and second position when the solenoid windings are respectively individually energized. The solenoid winding 23 is connected between an energizing source 27 and a switch 35 by a lead 31. The switch 35 is normally biased to the open position by a spring 33 and it is positioned to be closed by a member 17 when the piston stem 18 is fully retracted thereby to complete the energizing circuit about the winding 23. Thus, the valve 29 will be placed in the first position. Similarly, the solenoid winding 25 is connected between an energizing source 37 and a switch 39 by a lead 41. The switch 39 is normally biased to the open position by a spring 43 and it is positioned to be closed by the member 17 when the piston stem 18 is fully extended thereby to complete the energizing circuit about the winding 25. Thus, the valve 29 will be moved to or placed in the second position.

The automatic, yet controlled operation of the piston structure 12, is facilitated by a speed regulating valve mechanism generally identified by the numeral 32. The mechanism 32 is composed of two basic relatively movable structures. One of these structures is in the form of an inverted L-shaped superstructure 34. The other is a rectangularly block shaped member known as a valve block 36. The valve block 36 is provided with a fluid passageway which forms a part of the aforementioned fluid circuit. One end of the fluid passageway is connected by the line 26 with the valve 29 while the other is connected with the piston structure 12 by the fluid circuit conveying line 24 to enable fluid to pass through the fluid passageway of the valve block.

The movement of fluid through the fluid passageway of the valve block 36 is regulated by a valve structure diagrammatically shown in FIG. 1, but the details of which are more fully illustrated in FIGS. 3, 4 and 6. Referring to FIGS. 3, 4 and 6, the valve structure comprises one element 38 of a ring-shaped valve seat that is adapted to be engaged and closed by a movable valve element 40. When the movable valve element 40 engages the valve seat element 38 as illustrated in FIGS. 4 and 6, the fluid passageway in the valve block 36, connecting the fluid conveying lines 24 and 26, is closed. The valve element 40 has a curved surface tapering outward and downward from its upper end which, when spaced from the seat 38, permits maximum opening of the fluid passageway. As the valve 40 moves upward toward the ring-shaped valve seat 38 to engage the same, it variably closes or throttles the fluid passageway to regulate the volume of flow of fluid passing between the lines 24 and 26.

The valve structure comprises a pivot bushing 42 mounted within the valve block 36. The upper end of the pivot bushing 42 extends upward beyond the top of the valve block and is enlarged in diameter at 44 to be positioned within an appropriate opening provided in the superstructure 34. Positioned beneath the bushing 42 is a spacer ring 46 which provides an abutment for a yieldable spring 48 contained within the bushing. A valve seat bushing 50 is positioned below the spacer ring 46 and includes spaced fluid seals 52 to insure that the passage of fluid is limited to the fluid passageway and is directed between the lines 24 and 26.

The lower end of the valve seat bushing 50 is provided with a plurality of apertures 54 to permit the fluid to move freely and unobstructedly between the lines 24 and 26. The valve seat bushing 50 terminates at its lower end in an annular contour 56 that coincides in shape with the curved tapering surface of the movable valve element 40. The annular contour 56 is a continuation of the ring-shaped valve seat and of the valve seat element 38. Hence, when the valve element 40 is in its closed position as illustrated in FIGS. 4 and 6, the annular valve seat contour 56 engages the mating curved surface of the valve element 40 while the ring-shaped valve seat element 38 engages against the enlarged rim of the same to insure complete closure of the fluid passageway.

Guided for reciprocating movement within the valve block and forming a part of the valve structure is a valve steam 58. The upper end of the valve stem 58 is located within an inverted cup-shaped element 60 that also receives the upper end of the spring 48 therein. Because the spring 48 is positioned between the spacer ring 46 and the cup-shaped end 60 of the valve stem 58, the valve stem is constantly urged yieldingly upward in the valve block 36. The cup-shaped end 60 limits the upward movement of the valve stem by its engagement with the superstructure 34 and that portion of the wall thereof which defines the opening in the superstructure through which the upper end of the valve stem 58 projects.

The lower end of the valve stem 58 is narrowed in diameter at 62 and is received in an oversized opening defined in the valve element 40 whereby the valve stem 58, at its lower end 62, and the valve element 40 are permitted movement relative to each other. The valve element 40 is guided for movement within the valve block at its lower end and has positioned thereabout urging means in the form of a yieldable element, as a spring 64. The spring 64, bearing at its lower end against the valve block, constantly tends to yieldingly urge the valve element 40 upward toward closing engagement with the valve seat 38–56 to close the fluid passageway and the movement of the fluid between the lines 24 and 26.

The upper end of the valve stem 58 is constantly urged by the spring 48 into engagement with an operating lever 66. The lever 66 is pivotally mounted intermediate its ends at 67 for swinging movement within an elongated U-shaped slot or groove defined at the upper end of the superstructure 34 between the legs or sides 68. The opposite end of the operating lever supports a roller bearing 70 that is adapted to be engaged by the contour of the cam 20 and to be pivotally moved thereby in response to the shape or contour of the cam.

A tensioning means or force applying structure is mounted in the leg of the superstructure 34 of the speed regulating valve mechanism 32. It includes an adjustable micro-screw 72 that is threadedly engaged in the leg of the superstructure 34 and includes a recess in which urging means in the form of a spring 74 is mounted. The upper end of the spring 74 abuts against a shoulder of a force applying member 76 that protrudes upward into engagement with the operating lever 66 and is positioned between the legs 68 of the U-shaped groove. The lower end of the force applying member is narrowed in diameter and slides freely through a hole in the knurled lower protruding end of the adjustable micro-screw 72. The lower end of the member 76 is threaded at 78 to receive a stop means in the form of a nut 80.

By threading the micro-screw 72 upward into or downward out of the superstructure 34, the spring 74 may be adjustably tensioned to exert a predetermined force on the force applying member 76. The upward limit of movement of the force applying member 76 is controlled by the adjustment of the stop nut 80 along its lower threaded end 78. Thus, in FIGS. 3 and 4, the adjustable micro-screw 72 is shown threaded fully upward into the superstructure 34 and thereby causes the spring 74 to exert its maximum force on the member 76. In FIG. 6, the micro-screw 72 is shown threaded partially outward of the superstructure 34 and thereby permits the spring to assume a more expanded condition and thus reduces the force exerted by the spring 74 on the member 76.

Both the valve stem 58 of the valve structure and the force applying member 76 are located as to engage roller elements 82 which are equally spaced from and on opposite sides of the lever pivot 67. Thus, the one part of the lever 66 engaged by the valve structure and the other part of the lever engaged by the force applying member 76 are equally spaced from the pivot 67 and on opposite sides thereof. This arrangement enables the lever 66 to be reversed from its position as shown in FIGS. 1 to 5 inclusive to that shown in FIG. 6. FIG. 6 illustrates the versatility of the lever 66 so its roller bearing 70 may be reversed from its position wherein it is shown adjacent to the force applying member 76 in FIGS. 1 to 5, to a position where it is shown adjacent to the valve structure as shown in FIG. 6. Hence, when the lever 66 is reversed about its pivot 67, the valve structure and the tension means or force applying structure each reversely engage with different but opposite parts of the lever than before.

The valve block 36 is provided with a plurality of equally spaced mounting holes 84 that enable the valve mechanism 32, as a whole, to be secured to any convenient support by passing screws or other securing means therethrough for engagement with a suitable supporting surface, not shown. As previously noted, the superstructure 34 and the valve block 36 are movable for adjustment relative to each other. In FIGS. 1, 2, 3 and 4, the valve block and superstructure are shown to be in alignment with each other. FIG. 5 illustrates the position of the valve block 36 rotated 90° relative to the superstructure 34 to enable the mechanism 32 as a whole to be secured to a supporting surface.

In order to provide for the relative movement and adjustment of the valve block 36 and support structure 34, a series of four lock screws 86 are threaded downward through the legs 68 of the superstructure 34 for engagement with equally spaced mating holes provided in the valve block. Thus, by unthreading the screws 86, the valve block 36 may be rotated about the enlarged end 44 of the pivot bushing 42 relative to the superstructure 34 into a position such as that illustrated in FIG. 5. Thereafter, the valve block and superstructure may be locked together by the rethreading of the lock screws 86 into the valve block.

In operation, fluid under pressure is received at the valve 29 from the source 28. If the piston element 14 is in its rear-most position as shown in FIG. 1, the switch 35 will be closed and the switch 39 will be biased to the open position by the spring 43. Accordingly, the solenoid winding 23 will be energized thereby placing the valve 29 in the first position. Fluid under pressure therefore will be supplied along line 22 of the fluid circuit to the rear end of the piston housing 16 in the direction of the arrow 88. As the fluid enters behind the piston element 14, the piston is caused to move forward under the pressure of the increasing volume of fluid entering the rear of the housing 16. This causes the cam 20 to move with the piston, as well as any other associated machine tool that may be connected with its stem 18. The forward movement of the piston element 14 is facilitated by the expelling of fluid before it from the housing 16. The forward movement of the stem moves the member 17 away from the switch 35 which is biased open by the spring 33 to de-energize the solenoid winding 23.

The expelled fluid moves out of the forward end of the housing 16 by way of the fluid circuit line 24 into fluid passageway of the speed regulating valve mechanism 32. The fluid expelled from the piston housing 16 is permitted to pass through the fluid passageway of the valve mechanism 32 because the lever 66 has been actuated to move about its pivot 67 to its active starting position as shown in FIGS. 1 and 3 by the force applied thereagainst by the member 76. The upwardly urging force of the member 76 applied against the lever 66 causes the valve stem 58 to be displaced downward such that its narrowed end 62 engages and displaces the movable valve element 40 downward and away from the valve seat 38–56 and against the opposition of the spring 64. Thus, the fluid passageway of the speed regulating valve mechanism 32 is open and permits the passage of fluid therethrough from the line 24 to the line 26 and back to the source 28 for continued application by way of the line 22 to the rear of the piston element 14.

The movement of fluid is accomplished rapidly because the valve element 40 presents no obstruction to the full volume flow of fluid through the passageway in the valve block 36. This rapid movement of fluid through the valve block and hence to the rear of the piston element 14 is illustrated by the flat line 90 in the diagram of FIG. 1. Thus, the forward movement of the piston element 14 is accomplished rapidly.

However, during the forward movement of the piston element, the contour of the cam 20 approaches the roller 70 of the lever 66 as shown in FIG. 3. When the contour of the cam 20 engages the roller 70, the lever 66 is actuated thereby for movement above its pivot 67 and against the force applied thereto by the tension means or force applying member 76. Because there is a continued flow of fluid about the valve element 40, there is also a continued flow of fluid to the rear of the piston element 14 causing it to move forward. As the cam 20 actuates the lever 66 by engagement with it, the pivoting of the lever permits the valve stem 58 to move upwardly under the influence of springs 48 and 64 to remain in connecting engagement with its respective part of the lever 66.

The upward movement of the valve stem 58 is followed simultaneously by the movable valve element 40 which is subject to the urging of the spring 64. As the valve element 40 moves upwardly, its curved tapered surface moves closer toward engagement with the ring-shaped valve seat 38–56 thereby throttling and thus regulating the volume of fluid flow through the fluid passageway of the valve block 36 and from the line 24 to the line 26. Hence, the flow of fluid by way of the line 22 to the rear of the piston element 14 is similarly controlled and throttled to slow the forward movement of the piston 14. This is depicted in FIG. 1 wherein the contour of the cam 20 is aligned by dot and dash lines with respective portions of the solid curve line of the graph to illustrate how the contour of the cam engages and actuates the lever 66 to cause it to pivotally move and operate the valve structure to control the throttling and regulation of the volume of fluid flow through the fluid passageway in the valve block 36.

When finally the surface 92 of the cam 20 moves over and into actuating engagement with the roller 70 of the lever 66, the lever 66 is now in its greatest inactive position of actuation as shown in FIG. 4. This permits the valve stem 58 of the valve structure to move fully upward so that the urging of the spring 64 now causes the valve element 40 to become fully engaged with the ring-shaped valve seat elements 38 and 58 as shown in FIG. 4. The valve element 40 now fully closes the fluid passageway in the valve block 36 and completely obstructs the fluid circuit between the speed regulating valve mechanism 32 and the piston structure 12. Further flow of fluid to the rear of the piston element 14 is now terminated as indicated by the ending of the solid line in the graph of FIG. 1.

When the stem 18 reaches its fully extended position, at the end of the stroke of the piston element 14, member 17 engages and closes the switch 39 thereby energizing the solenoid winding 25. Valve 29 is thereupon moved to the second position and fluid from the source 28 is supplied to the line 26 and into the fluid passageway of the valve block 36 to apply its force against the movable valve element 40 in opposition to the urging of its spring 64. As the back pressure in the line 26 increases in sufficient force to overcome the normal force of the spring 64, the valve element 40 is gradually unseated and moved downward. This gradual downward movement and gradual separation of the curved tapered surface of the valve element from the valve seat annular contour 56 and ring-shaped surface 38 permits the gradual reverse movement of fluid from the line 26 downward and through the fluid passageway of the valve block 36 to exhaust outward therefrom by way of the line 24.

The gradual unseating movement of the valve element 40 and the limited flow of fluid at the beginning of the return or reverse stroke of the piston element 14 is illustrated by the dash line 94 as shown in the graph of FIG. 1. However, as fluid pressure rapidly increases, the valve element 40 is rapidly moved an increasingly greater distance or spacing from the valve seat 38–56 until such time as it is actually fully spaced away from the valve seat and the reverse flow of fluid from the line 26 to the line 24 is unobstructed. This unobstructed flow of fluid is illustrated by the dash line 96 in the graph of FIG. 1. The unobstructed flow of fluid in the reverse direction from line 26 to line 24 through the speed regulating valve mechanism 32 now supplies moving fluid to the forward face of the piston element 14 in the housing 16 while permitting the exhaust of fluid from the rear face of the piston element to the source 28 by way of line 22. As the stem 18 is retracted the member 17 is disengaged from the switch 39. The switch 39 is biased open by the spring 43 thereby de-energizing the solenoid winding 25.

This rapid reverse reciprocating movement of the piston 14 causes the contour of the cam 20 to rapidly become disengaged from the roller 70 of the lever 66 thereby permitting the lever to reassume its active starting position as shown in FIGS. 1 and 3. There comes a time during the rearward or reverse movement of the piston element where it begins to approach its limit of such movement. At that time, the fluid pressure in the forward end of the piston housing 16 increases and the rearward movement of the piston 14 becomes gradually slower as depicted by the dash line 98 of the graph shown in FIG. 1. When finally fluid can no longer be introduced in the forward end of the piston housing 16 and the piston 14 has reached its rearward limit of movement as shown in FIG. 1, the member 17 engages and closes the switch 35 to again energize the solenoid winding 23. Thus, the valve 29 is again moved to the first state and fluid once again flows along the line 22, and again to the rear face of the piston element 14 to start a new cycle of operation.

Thus, it will be recognized that the present invention operates automatically to regulate the direction of flow of fluid within a controlled fluid system and thereby automatically control the operation of any machine tool or other mechanism that may be associated with the regulated piston 14. The speed of movement of the piston during its working stroke as depicted by the solid line 100 and 90 in the graph of FIG. 1 is selectively controllable. This control is accomplished by the adjustment of the tension means mounted within the leg of the superstructure 34.

The tension means, comprising the force applying member 76 and its associated adjustable details, applies a resistance to the movement of the lever 66 in response to its engagement by the contour of the cam 20. Thus, by adjustment of the microscrew 72 relative to the leg of the superstructure 34, it is possible to vary the force that is applied to the member 76 by the spring 74. If the spring 74 is caused to apply its greatest force to the member 76, which force is transmitted to the lever 66, the lever will respond and move more slowly as it is engaged by the contour of the cam 20. However, if the tension of the spring 74 is reduced and its pressure relaxed on the member 76, the lever 66 will respond more easily and more rapidly to the contour of the engaging cam 20. The responsive pivotal movement of the lever 66 in turn controls the operation of the valve structure engaged therewith and connected to it at the stem 58. Thus, the responsive movement of the valve element 40 is intimately controlled to throttle and regulate the volume of fluid moving through the fluid passageway of the valve block 36 during the forward working stroke of the piston element 14.

The operation of the speed regulating valve mechanism 32 shown in FIG. 6, wherein the operating lever 66 is illustrated in its reversed position, is substantially the same as that described above. The movement of the lever 66 is intimately controlled by the tension applied thereagainst by the tension means which includes the force applying member 76 and its associated elements of structure. Thus, the tension structure, in turn, controls the operation of the valve structure in the fluid passageway. The stop means 80 threadedly mounted for adjustment on the stem 78 of the force applying member 76 limits the upward movement of the force applying member and thus controls the extent to which such member will move upward in the groove between the legs 68 of the superstructure 34 for engagement with the lever 66.

Throughout the present invention, the term "fluid" has been employed. It is recognized that the term "fluid" is here utilized to include liquids as well as gases. In practice, the present invention has utilized air as the operating fluid. Thus, in actual use, the present invention has been pneumatically operated. However, applicant's pneumatic operation of the invention by the use of a fluid gas should constitute no limitation upon the scope of the disclosure since it will be readily recognizable by those skilled in the art that a liquid fluid will operate equally as well.

While there have been shown and described and pointed out the fundamental novel features of the invention as applied to a preferred embodiment thereof, it will be understood that various omissions and substitutions and changes in the form and details of the device illustrated and its operation may be made by those skilled in the art, without departing from the spirit of the invention. It is the intention, therefore, to be limited only as indicated by the scope of the claims appended hereto.

I claim:

1. A speed regulating valve mechanism comprising a fluid passageway in said mechanism, a movable valve structure including a normally closed valve element in said passageway, said valve element being movable with said valve structure in said passageway to open and variably regulate the passage of fluid through said passageway, means constantly urging said valve element to close said passageway, a lever movable on said mechanism and having a part thereof engageable with said valve structure to move the same to cause said valve element to variably open said passageway in opposition to said urging means and to permit the same to close in response to said urging means, said valve element being movable on and relative to said valve structure to open said passageway in response to the reverse pressure of fluid therein, and means on said mechanism to apply a variable force on said lever to variably control its speed of movement and the movement of said valve element.

2. A speed regulating valve mechanism as in claim 1, said valve element being movable independently of said lever to open said fluid passageway in response to fluid pressure acting on said valve element in opposition to said urging means.

3. A speed regulating valve mechanism as in claim 2, said valve structure including a ring-shaped valve seat therein, and said valve element being movable in said ring-shaped seat for engagement therewith to close said fluid passageway, said valve element having a curved surface, said curved surface tapering outward from its one end which permits maximum opening of said fluid passageway to its other end which engages said seat to close said fluid passageway.

4. In an automatically controlled fluid system, a reversely movable piston, a contoured cam movable with said piston, a movable speed regulating valve mechanism including a movable valve element, a source of fluid, a fluid circuit connecting said fluid source with said piston and including fluid conduit means connecting said valve mechanism with said piston, said valve element being movable in said fluid circuit to open and close and variably regulate the passage of fluid through said circuit in two directions, means on said speed regulating valve mechanism engageable with said cam during the movement thereof and connected with said valve mechanism to cause the valve element to move an amount in accordance with the contour of said cam to vary the amount of the flow of fluid in one direction about said valve element to said piston according to the contour of said engaged cam whereby said piston is caused to move in one direction at speeds corresponding to the varied flow of fluid, said valve element being movable in response to fluid pressure in the reverse of said one direction of flow of fluid to reverse the direction of the flow of fluid to said piston to cause said piston to move in the reverse direction at speeds uncontrolled by the contour of said cam.

5. A system as in claim 4, wherein said speed regulating valve mechanism comprises a superstructure, a valve block having a fluid passageway, a valve structure in said mechanism, said superstructure and valve block being relatively displaceable about said valve structure, said valve structure including a valve seat, and a movable valve stem, said valve element being movable conjointly with and relative to said valve stem and valve seat for engagement with said valve seat to close said fluid passageway and for variable spacing from said valve seat to open said fluid passageway to regulate the flow of fluid therethrough and yieldable means normally urging said valve element for conjoint movement with said valve stem for engagement with said valve seat to close said fluid passageway and yieldable to permit said valve element to move relative to and independently of the valve stem to open said passageway, and an actuating lever pivoted for movement on said superstructure and engageable with the contour of said cam to be actuated and pivotally moved thereby during the movement of said cam to cause said valve stem and said valve element to move conjointly.

6. A system as in claim 5, and a force applying member in said mechanism engageable with said lever, spring means urging said force applying member into engagement with said lever and yieldable in response to the pivoting movement of said lever, and means to vary the tension of said spring means to vary the force applied by said member on said lever.

References Cited by the Examiner
UNITED STATES PATENTS

| | | | |
|---|---|---|---|
| 2,138,125 | 11/1938 | Schultz | 137—522 |
| 2,902,050 | 8/1959 | Carls | 91—24 X |
| 3,013,532 | 12/1961 | Harper | 91—24 X |
| 3,028,875 | 4/1962 | Alquire | 137—238 |

MARTIN P. SCHWADRON, *Primary Examiner.*

P. T. COBRIN, *Assistant Examiner.*